March 22, 1966    P. T. KAESTNER    3,242,478
HIGH RESOLUTION ENCODER
Filed Nov. 29, 1961
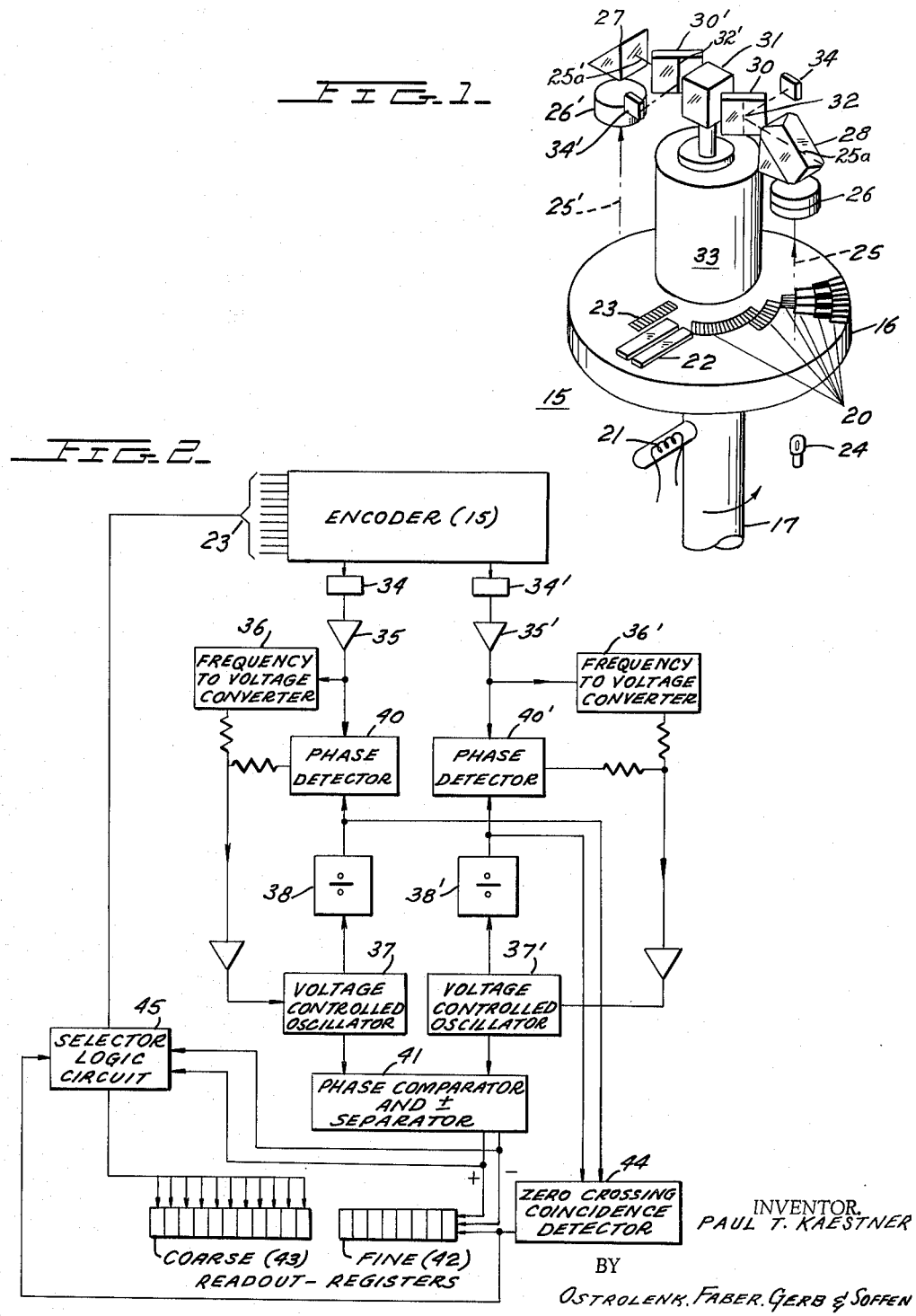
INVENTOR.
PAUL T. KAESTNER
BY
OSTROLENK, FABER, GERB & SOFFEN
ATTORNEYS

United States Patent Office

3,242,478
Patented Mar. 22, 1966

3,242,478
HIGH RESOLUTION ENCODER
Paul T. Kaestner, Huntington, N.Y., assignor to Kollsman Instrument Corporation, Elmhurst, N.Y., a corporation of New York
Filed Nov. 29, 1961, Ser. No. 155,709
9 Claims. (Cl. 340—347)

This invention relates generally to high resolution encoders particularly of the rotary digital type.

The digital encoders of the invention are suitable for relatively small size, yet performs with high accuracy with readout at high rates of input rotation. The output is provided electro-optically. A novel feature hereof is the use of two outputs related at 180° about the encoder system axis, which eliminates first order eccentricity errors. The fine channel outputs are herein derived from a multiplicity of lines instead of from individual ones. In this manner accurate encoding results with smaller diameter units.

The above and other advantages, features and objects of the present invention will become more apparent from the following description of an exemplary embodiment thereof, illustrated in the drawings, in which:

FIGURE 1 is a schematic showing, in perspective of the exemplary encoder.

FIGURE 2 is a schematic block diagram of a system for converting the encoder optical output to a binary readout.

FIGURE 1 illustrates the essential working elements of the digital encoder 15. The encoder disc 16 is driven by an input shaft 17. The disc 16 provides a number of channels of digital data indicated at 20, in concentric annuli. Cyclic binary or Gray code, as shown, was chosen since the output data is produced by a change in optical condition (opaque to transparent, or transparent to opaque), in only one of the channels for each succeeding digit. This minimizes chance of gross errors. The disc 16 is read by means of a lamp 21. The reading is made through slit 22 by a series of photo-sensitive detectors 23. The encoder 15 construction to this point is well known in the art.

Utilizing two lamps 24 (one not shown), spaced at 180° intervals relative to disc 16, the outermost or least significant channel (20) is imaged at 180° locations by lenses 26, 26'. The light from the 180° opposite lamps 24 form beams 25, 25' through the least significant i.e., outermost channel of the channel data (20) and impinge on the lenses 26, 26'. After passing through the lenses 26, 26', the light passes through right angle prism 27 for one channel (25') and Amici prism 28 for the other channel (25). The light from Amici prism 28 passes into one (30) of two diagonal glass plates, to an Anderson prism 31. An Anderson prism is defined as a substantially square-shaped prism [which is shown designated by the numeral 31 in FIGURE 1], which prism is designed to rotate about its longitudinal axis for the purpose of moving an image across a slit or reflecting member wherein said image is moved at the rate of four times per revolution of the Anderson prism. The Anderson prism is described in the book Amature Telescope Making, by A. G. Ingalls, Associate Editor, copyright 1933 by the Scientific American Publishing company, the description being set forth on pages 199 to 200 and a figure being set forth on page 201 [FIGURE 19]. The other beam, from prism 27, passes through the other diagonal plate 30', and to Anderson prism 31.

The images, after passing through the Anderson prism 31 are brought to focus at the center of the respective diagonal plates 30, 30' where respective narrow reflecting bands 32, 32' of the same width as the image of the slots in the disc 16 are provided. A motor 33 rotates the Anderson prism 31. As transparent line images move across the reflecting bands 32, 32' on the diagonal plates 30, 30', light pulses are produced which are beamed to and converted into electrical pulses by respective photo-sensitive detectors 34, 34'.

The Amici prism 28 is employed to bend the image 25 from the vertical to the horizontal direction as shown by the phantom line 25a. Right angle prism 27 bends the image 25' from the horizontal to the vertical direction as shown by phantom line 25a'. The Amici prism 28 also performs the further function of inverting the image which it bends, the inversion operation being characteristic of Amici prisms.

The image 25 therefore passes through lens system 26, is bent and inverted by Amici prism 28 and passes through diagonal plate 30 and into the Anderson prism 31. The Anderson prism 31 being rotated about its longitudinal axis by motor 33 causes the inverted image 25a to sweep across diagonal glass plate 30'. In sweeping across diagonal glass plate 30' the image at a particular instant of time impinges upon a narrow reflecting band 32' provided on diagonal glass plate 30'. This image is reflected toward the photo-sensitive detectors 34'.

In a similar fashion the image 25' is bent by right angle prism 27 in the direction shown by the line 25a'. The image 25a' passes through diagonal glass plate 30' and into the Anderson prism 31. Prism 31 being constantly rotated about its longitudinal axis causes the image 25a' to sweep across diagonal glass plate 30. At a particular instant of time the image 25a' impinges upon the narrow reflecting band 32 which reflects the image toward photo-sensitive detector 34.

This arrangement produces electrical frequencies at the two detectors 34, 34' which are increased at one detector and decreased at the other as the encoder disc 16 is rotated.

The reason for the two unequal frequencies being generated by photo-sensitive detectors 34 and 34' is due to the fact that while the image through right angle prism 27 is merely bent, the image through the Amici prism 28 is inverted as well as being bent. Thus, when the coded disc 16 is rotating at the same time that Anderson prism 31 is rotating, this causes one image to generate an increased frequency rate and the other image to generate a decreased frequency rate. If the direction of disc rotation is reversed, the frequency relationship is reversed. If the disc 16 is stationary, the two frequencies are the same. Since the light path through the prism 31 is identical for both optical channels, any Anderson prism imperfections or non-linearities result in identical aberrations or modulations to both detectors 34, 34'. Change in the slope of the radial lines imaged from the disc 16 can be offset by tapering the prism 31.

Although three separate light sources (21, 24) are used herein, it is feasible to use a single common source with appropriate reflectors and condensing lenses. The encoder 15 package desirably includes the transistorized preamplifiers needed to provide adequate electrical signal transmission.

FIGURE 2 shows, in block form, one method for handling the outputs generated by the encoder 15 to provide a binary readout. The two frequency outputs provided by the optical scanning system of the encoder 15 at photo-sensitive detectors 34, 34' are handled in identical fashion, utilizing passive servo loops. The outputs are passed through amplifiers 35, 35' and are converted to voltages which are utilized as rate signals analogous to those produced by generators in conventional motor driven servos. The frequency to voltage converters 36, 36' provide the nominal outputs to control respective voltage controlled oscillators 37, 37' which produce pulses at frequencies substantially higher than those provided from the scanning action of the encoder 15. These high frequency pulses are respectively passed through a dividing network 38, 38' to produce pulses of the same frequency as those from the encoder 15. The two sets of signals are thereby compared through phase detectors 40, 40' to provide a position or phase locking signal. This arrangement provides a follow-up which is free of velocity lag errors. The operation of the phase locked loop is such that the frequency signal output from amplifiers 35 and 35' are converted to analog voltages through converters 36 and 36', respectively. These voltages are impressed upon voltage controlled oscillators 37 and 37', respectively, to establish the operating frequency of the voltage controlled oscillators 37 and 37'. The operating frequencies are much greater than the frequency of the signals generated by the photo-sensitive detectors 34 and 34'. The high frequency signals are passed through frequency divider circuits 38 and 38', respectively, which generates an output frequency which is some harmonic of the input frequency signal available at the outputs of amplifiers 35 and 35'. The phase relationship between the harmonic signal available at the outputs of frequency dividers 38 and 38' are phase compared against the input signals from amplifiers 35 and 35', respectively, in the phase detectors 40 and 40', respectively. A voltage having an amplitude level representative of the phase difference is generated at the output of phase detectors 40 and 40' and is summed with the output of the frequency to voltage converters 36 and 36', respectively, to provide a feedback control employed to lock in the operating frequency of the voltage controlled oscillators 37 and 37', respectively.

While the ideal waveshape of the output signals should be a triangular waveform, the output signals from photosensitive detectors 34–34' should be a repetitive triangular waveshape. It has been found that this waveshape is substantially sinusoidal. These substantially sinusoidal outputs are utilized to determine the instantaneous shaft angle portion of the rotating shaft 17.

The outputs of the two voltage controlled oscillators 37, 37' which follow up the encoder frequency outputs, are summed by a phase comparator and plus-minus separator circuit 41, and their sum is counted into the fine readout register 42. When the outputs of the oscillators 37 and 37' are summed a suppressed-carrier waveform is obtained which waveform is substantially a cosine waveform modulated by a sine waveform [or a sine waveform modulated by a cosine waveform]. Each time this suppressed-carrier waveform goes through a half cycle this represents movement of shaft 17 through a predetermined incremental angle since the amount of angular rotation of shaft 17 is related [through a constant of proportionality] to the phase relationship between the two output signals. A count of the number of zero crossings of the suppressed-carrier waveform provides an instantaneous tabulation of the shaft displacement of shaft 17. The instantaneous count is accumulated in fine read out register 42. To assure frequency restandardization of the count and thus avoid cumulative errors, a zero reset signal is produced at the fine register by the use of a zero crossing coincidence detector 44 which derives its signal from the outputs of the two voltage controlled oscillators 37, 37' after division at 38, 38'.

The coarse readout is obtained from the slit readout of the encoder disc 15. To provide coincidence of register shift with the fine readout register, selector logic circuitry 45 is employed. The selector logic circuit 45 is fed directly from the photosensitive detectors 23 output of the encoder 15, and collaterally by the output of phase comparater and plus-minus separator 41, as well as zero crossing coincidence detector 44. The selector logic circuit 45 may take the form of two shift registers which convert the Cyclic or Gray code from the disc to straight binary; one register reading the actual disc output and the other, through a logic network, producing a reading of the adjacent binary number. The selection of the proper shift register depends on direction of disc rotation obtained by having a running record of whether plus or minus pulses are being produced by the phase comparator and plus-minus separator 41.

The zero crossover coincidence pulse referred to hereinabove, is then used to read the proper register for coarse readout to coarse register 43. With such an arrangement, the coarse register shift is arranged to occur when the disc readout slit 22 is located nominally midway between disc readout shifts.

A numerical analysis follows to further illustrate the features and advantages of an embodiment of the invention system and encoder.

Using a 13 channel disc (16) having Cyclic or Gray code output, the outermost or least signifiicant annular channel is marked with 2048 transparent and 2048 opaque radial slits. This represents 2048 cycles of data for one revolution of the disc (16), during which one output channel of the scanning system produces 4096 more cycles than the other. Thus as one channel provides 2048 pulses more than those produced by the scanning system, the other channel produces 2048 less.

If we decide to produce an output reading to $$2^{20} = 1,048,576$$

counts (approx. 1¼ seconds of arc), it is necessary that the pulse frequencies at the outputs of the voltage controlled oscillators (37, 37') be 256, ($2^8$) times those produced by the scanning system. Similar digital phase dividing devices are practical with ratios up to 1024.

Limiting the frequency range of the voltage controlled oscillators (37, 37') to ±20%, the pulses produced by scanning action of the Anderson prism (31) must occur at 5 times the rate of those produced by the maximum readable pulse rate produced by the rotation of the disc (16). If we select 120 degrees per second as a useful maximum disc (16) speed, it becomes necessary for the Anderson prism (31) scanning action to produce $$\frac{120}{360} \times 4096 \times 5 = 6827$$

pulses per second. Using a prism (31) speed of 1800 r.p.m. (30 r.p.s.), $$\frac{6827}{30} = 227.6$$

pulses must be produced per revolution of the prism. Since the Anderson prism (31) has 4 sides, each side must scan $$\frac{227.6}{4} = 57$$

lines on the disc. This represents 10 degrees of the disc (16), and the Anderson prism (31) can be constructed with a 5 degree taper on all faces. Dimensionally the size of the object plane should not introduce any severe re-imaging problems for the optical systems.

The aforesaid optical encoder (15) for 13 channels may employ a disc (16) as small as 3" in diameter, and fit into a case length of 6 inches. Although an exemplary form of the encoder and readout system has been described, it is to be understood that modifications may be made therein without departing from the broader spirit and scope thereof, as set forth in the following claims.

The embodiments of the invention in which an exclusive privilege or property is claimed are defined as follows:

1. A rotary digital encoder comprising an encoder disc with a plurality of channels of digital data in concentric annular array, first and second optical means at paths oriented through the disc data array at 180° separation in symmetrical relation at the radially outermost data channel positions, individual photo-sensitive elements associated with said first and second optical means responsive to light beams through the disc data and said pair of optical means for producing output signals of frequencies corresponding to the intercepted data, said first optical means including prism means for inverting the light beams which pass therethrough, and means for comparing the signals of said photo-sensitive elements for generating a signal indicative of angular displacement of said rotary encoder.

2. A rotary digital encoder comprising an encoder disc with a plurality of channels of digital data in concentric annular array, first and second optical means at paths oriented through the disc data array, a rotating prism positioned between said first and second means, said first and second optical means each having optical members for directing their optical paths towards said prism, individual photo-sensitive elements associated with said first and second optical means responsive to light beams through the disc data and said pair of optical means with said rotating prism intercepting the resultant beams for producing output signals of frequencies corresponding to the intercepted data, and means for comparing the signals of said photo-sensitive elements for generating a signal indicative of angular displacement of said rotary encoder.

3. A rotary digital encoder comprising an encoder disc with a plurality of channels of digital data in concentric annular array, first and second optical means at paths oriented through the disc data array in symmetrical relation, a rotating prism positioned between said first and second means, said first and second optical means each having optical members for directing their optical paths towards said prism, photo-sensitive elements associated with said first and second optical means responsive to light beams through the disc data and said pair of optical means with said rotating prism intercepting the resultant beams and scanning them for said elements for producing output signals of frequencies corresponding to the intercepted data, and means for comparing the signals of said photo-sensitive elements for generating a signal indicative of angular displacement of said rotary encoder.

4. A rotary digital encoder comprising an encoder disc with a plurality of channels of digital data in concentric annular array, first and second optical means at paths oriented through the disc data array at 180° separation in symmetrical relation at the radially outermost data channel positions, a rotating prism positioned between said first and second means, said first and second optical means each having optical members for directing their optical paths towards said prism, photo-sensitive elements associated with said first and second optical means responsive to light beams through the disc data and said pair of optical means with said rotating prism intercepting the resultant beams and scanning them for said elements for producing output signals of frequencies corresponding to the intercepted data, and means comparing the signals of said photo-sensitive elements for generating a signal indicative of angular displacement of said rotary encoder.

5. A rotary digital encoder as claimed in claim 2, in which said members comprise a right angle prism for said first optical means and an Amici prism for the second optical means.

6. A rotary digital encoder as claimed in claim 3, further including a first diagonal glass plate arranged to deflect the optical path from one of said optical means to its associated photo-sensitive element.

7. A rotary digital encoder as claimed in claim 4, in which said members comprise a right angle prism for said first optical means and an Amici prism for the second optical means, a diagonal glass plate arranged to deflect the optical path from one of said optical means to its associated photo-sensitive element, the rotary prism being arranged to sweep said optical path across said diagonal glass plate and thereupon being reflected to said photo-sensitive elements.

8. A rotary digital encoder as claimed in claim 6, further including a second diagonal glass plate arranged to deflect the optical path from the other of said optical means to its associated photo-sensitive element.

9. A rotary digital encoder comprising an encoder disc with a plurality of channels of digital data in concentric annular array, first and second optical means at paths oriented through the disc data array in symmetrical relation, photo-sensitive elements associated with said first and second optical means responsive to light beams through the disc data and said first and second optical means for producing output signals of frequencies corresponding to the intercepted data, said first optical means including prism means for inverting the light beams which pass therethrough, and means for comparing the signals of said photo-sensitive elements for generating a signal indicative of angular displacement of said rotary encoder; said comparison means including register means for accumulating the incremental angular displacements.

References Cited by the Examiner

UNITED STATES PATENTS

| | | | |
|---|---|---|---|
| 2,533,242 | 12/1950 | Gridley | 340—347 |
| 2,659,072 | 11/1953 | Coales | 340—347 |
| 2,685,082 | 7/1954 | Beman | 340—347 |
| 2,734,188 | 2/1956 | Jacobs | 340—347 |
| 2,966,673 | 12/1960 | Guernsey | 340—347 |

MALCOLM A. MORRISON, *Primary Examiner.*